Nov. 3, 1936.  W. W. LASKER  2,059,252

TABULATING MACHINE

Filed April 10, 1933  9 Sheets-Sheet 1

FIG. 1

INVENTOR
William W. Lasker
BY
Cletus H. Killian
ATTORNEY

Nov. 3, 1936.　　　W. W. LASKER　　　2,059,252
TABULATING MACHINE
Filed April 10, 1933　　　9 Sheets-Sheet 5

INVENTOR
William W. Lasker
BY
Cletus H. Killian
ATTORNEY

Nov. 3, 1936.  W. W. LASKER  2,059,252
TABULATING MACHINE
Filed April 10, 1933  9 Sheets-Sheet 9

INVENTOR
William W. Lasker
BY
Cletus H. Killian
ATTORNEY

Patented Nov. 3, 1936

2,059,252

UNITED STATES PATENT OFFICE 2,059,252

TABULATING MACHINE

William W. Lasker, Brooklyn, N. Y., assignor to Remington Rand Inc., Buffalo, N. Y., a corporation of Delaware Application April 10, 1933, Serial No. 665,359

7 Claims. (Cl. 235—58)

This invention relates to tabulators and in particular to improvements in the totalizers and printing mechanism of tabulators of the well-known Powers type.

One of the principal objects of the invention is to provide a tabulator of the general Powers type with novel algebraic totalizers, and with means for determining automatically whether items on the control cards are to be entered positively or negatively.

Another object is to produce such a device for obtaining direct subtraction simply and efficiently.

Another object is to provide a tabulator with a plurality of such totalizers for each unit, whereby totals or group-totals and grand-totals may be obtained.

Another object is to provide totalizers wherefrom positive and negative balances may be readily extracted.

Another object is to produce an alphabetical unit in which the type sectors may be set for a greater number of printing positions than heretofore, so that a greater number of characters may be available on each sector.

Another object is to produce numerical and alphabetical units which are interchangeable, so that tabulators may be assembled from stock subassemblies, to meet the exigencies of various businesses.

Another object is to provide a novel transitional-carry mechanism to compensate for the "fugitive one" which accompanies any change from positive to negative total or vice versa.

Another object is to produce a novel sign-printing mechanism.

Other objects will appear from the following detailed description, and be particularly pointed out in the appended claims.

Definitions

Because of confusion in terms as used in the art and in commercial practice, it is believed desirable before beginning any detailed description, to define certain terms used herein as to the means intended in this specification.

*Unit.*—The term "unit" or "numerical unit" as used herein will refer to one complete assembly of a group totalizer, a grand totalizer, and the associated printing mechanism.

*Alphabetical unit.*—The term "alphabetical unit" means a plurality of alphabetical printing sectors with their type firing or striking means, but without totalizers; it is comparable to a "unit" but has no totalizing means, and operates only to print desired matter.

*Denominational unit.*—The term "denominational unit" will be used to indicate the quantity "1" as raised to any denominational power.

*Total.*—The term "total" or "group-total", as used herein, refers to the amount obtained by adding and/or subtracting one or more amounts on a previously cleared totalizer; "taking a total" is printing such "total" and leaving the totalizer cleared; a "group-totalizer" is one on which such "totals" are obtained. (The term "sub-total" has been and still is somewhat confused with a "total" as above defined; but a "sub-total" is believed to be more accurately defined as an amount accumulated on a totalizer, printed therefrom, and retained thereby.)

*Grand total.*—A "grand-total" is the amount obtained by totalizing several "totals" or "group-totals", or by totalizing the whole number of items comprising several "totals" or "group totals".

*Positive balance.*—A "positive balance" is a "total" which appears as a positive amount in the totalizer.

*Negative balance.*—A "negative balance" is a "total" which appears as a negative amount in the totalizer.

(The terms "positive balance" and "negative balance" are used in preference to "credit balance" and "debit balance", because an overdraft, for instance, is a "credit balance" from the bank's point of view and a "debit balance" from the depositor's point of view, and thus these terms become confusing.)

Old Powers structure

Figure 1:
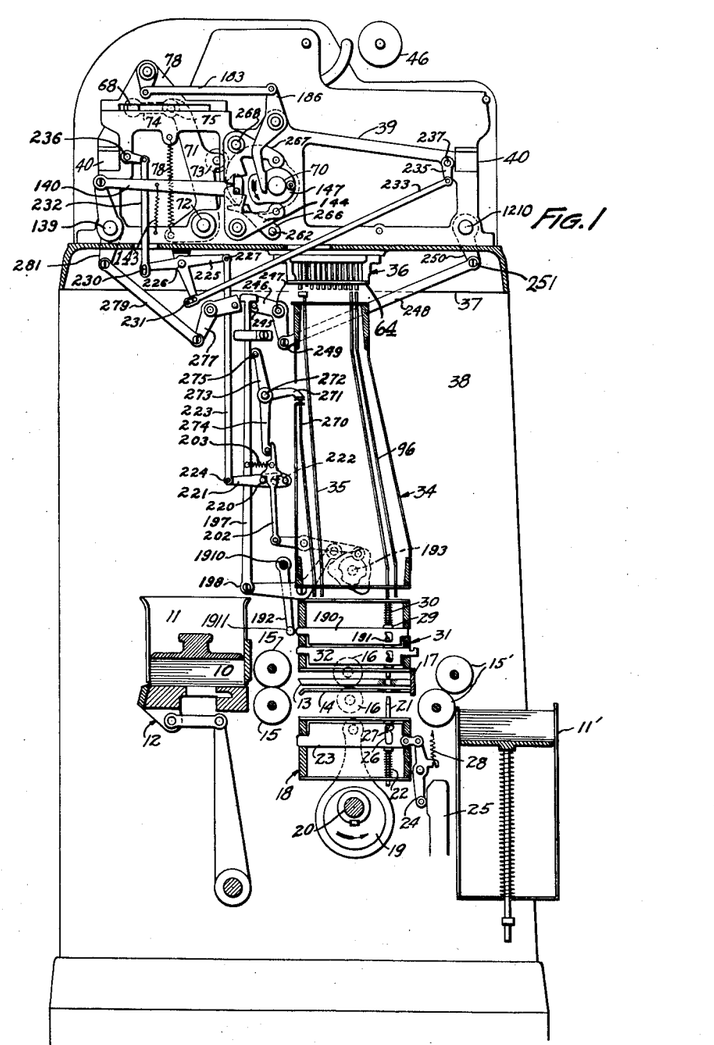
Fig. 1 is a side view in elevation of a Powers tabulating machine having the present invention applied thereto.
Figure 1A:
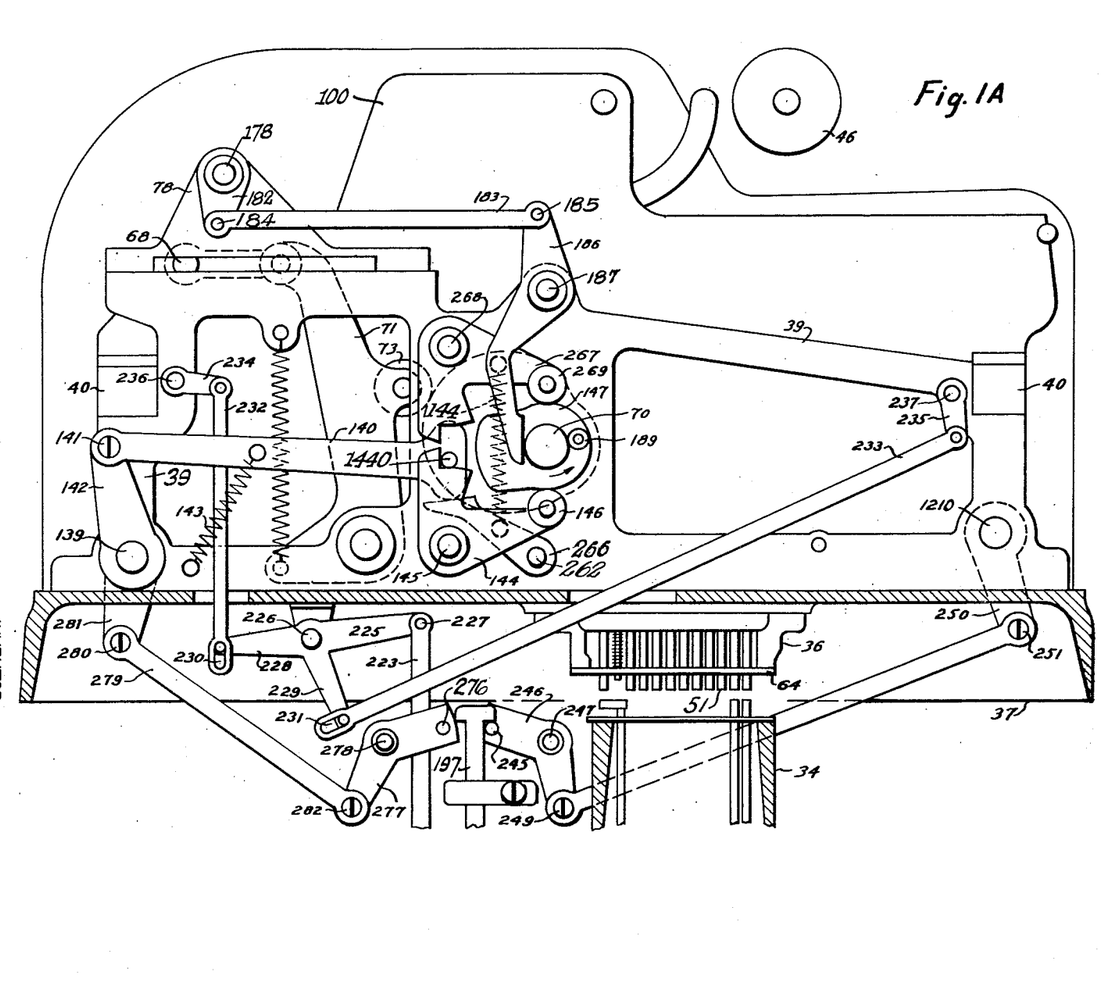
Fig. 1A is an enlarged side elevation of the computing head.

The Powers machine to which the present invention is applied is fully described in my co-pending application, Ser. No. 538,429, and in the corresponding foreign patents (France, No. 739,656; Italy, No. 299,982; Belgium, No. 382,387; Canada, No. 328,627; and Czechoslovakia, No. 44,797). In Figs. 1 and 1A hereof are shown cards 10, card magazine 11, picker block 12, sensing chamber plates 13 and 14, feed-rolls 15, skid rolls 16, card-stop 17, sensing pin-box 18, eccentric 19, main drive shaft 20, eject rolls 15', receptacle 11', sensing pins 21, springs 22, slides 23, slide spring 28, lever 24, cam 25, pin extrusion 27, slots 26, upper pin-box 31, pins 29, springs 30, locking slide 32, connection box 34, wires 35, and stop basket 36. All of these elements have the same construction, function and operation, as in the said application and foreign patents.

The computing head

Figure 7:
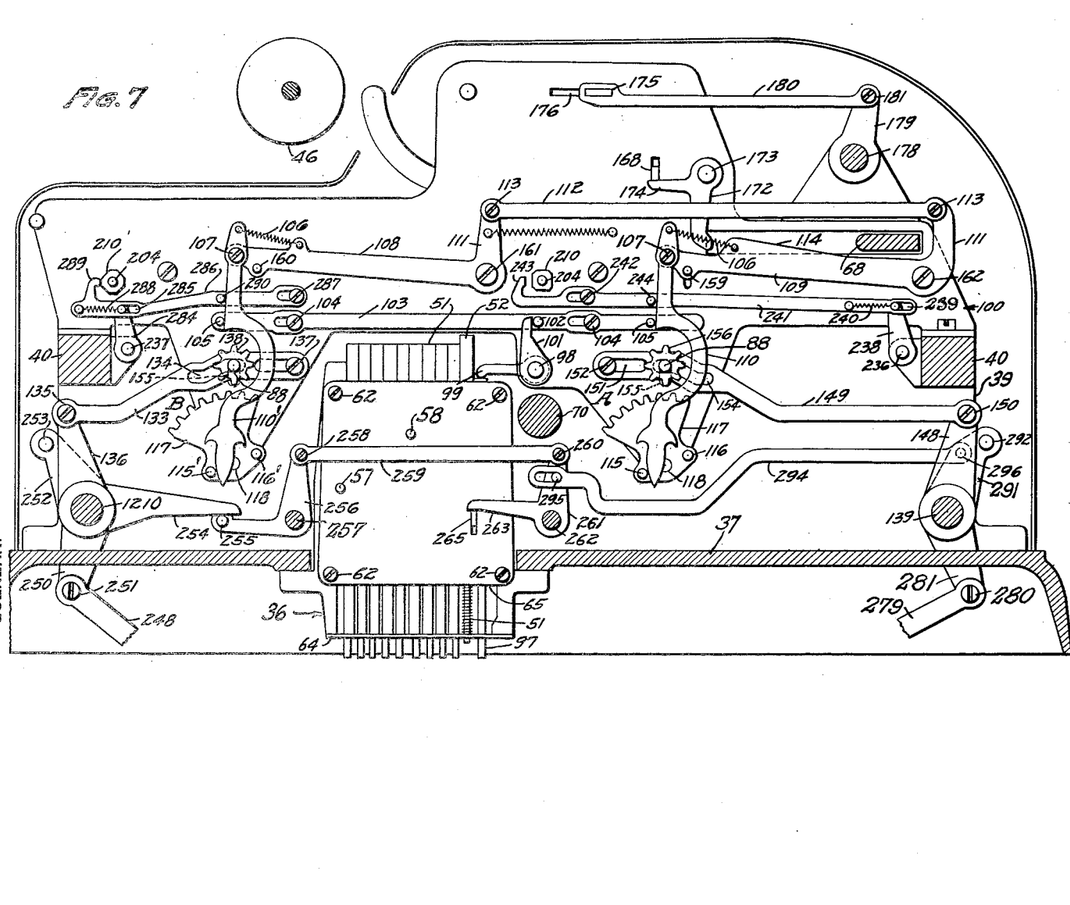
Fig. 7 is a side view, in elevation, of the control mechanism for a computing unit.
Figure 8:
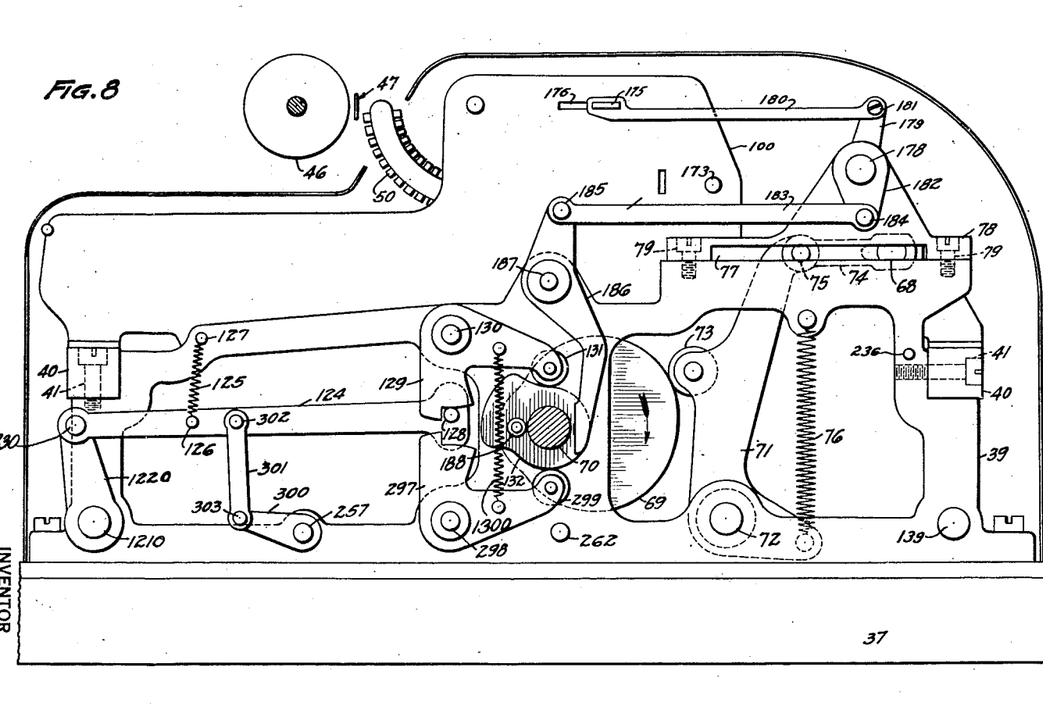
Fig. 8 is a side view, in elevation, of the computing head, showing the means employed in this invention for operating one set of totalizers and for controlling the rack-restoring bar.
Figure 14:
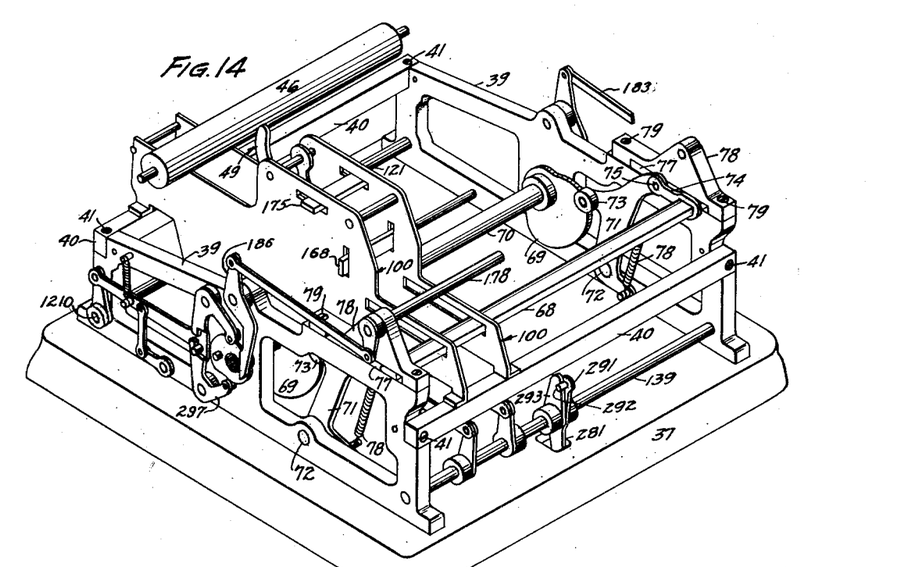
Fig. 14 is a skeleton perspective view of the computing head with parts omitted and broken away for the sake of clearness.

The computing head includes a base 37 (Figs. 1, 1A, 7, 8, and 14), supported on frames 38, and is provided with upstanding end plates or frames 39, secured thereto, and with a pair of connecting cross-bars 40 fastened to the end plates 39 by means of screws 41 (Figs. 8 and 14).

Usually, the head is provided with space for seven units, each unit being wide enough to accommodate ten associated totalizer wheels. But the space occupied by the numerical units is sometimes used for one or more alphabetical units.

Each numerical unit includes a series of slidably mounted rack-carrying members 42 (Fig. 2) conveniently spaced from each other and arranged to slide on cross-bars 43 and 44 in slots 45 in said member. There are as many members 42 to a unit as the desired denominational capacity (usually ten). The upper part of said units is provided with a printing mechanism of novel design, which includes in addition to the regular platen 46 and the regular ribbon mechanism indicated by the numeral 47, a rack 48 operatively connected with a sector 49. The movement of the rack is effective to swing the sector, which is provided in front thereof, with a series of types 50 spaced to correspond with the spacing of the teeth in the sector. This printing mechanism will later be described in detail.

Upon operation of the machine, each card is effective to set up a condition in the stop-basket 36 (Fig. 1), by raising any one of nine stops 51 (Fig. 2), this being done by the wires in the connection-box 34 as above described. Any one of said stops 51 is effective to retract a zero-stop 52 of its denomination, which is normally held in the position illustrated in Fig. 2, by means of a spring 53. The manner in which the zero-stop is retracted is fully illustrated in said Fig. 2, from which will be noted that each stop 51 is provided with a respective protruding pin 54, forming an integral part thereof; and that each pin is effective to directly rock one or the other of the two levers 55 and 56. Levers 55 and 56 are respectively pivoted on cross-shafts 57 and 58, lever 55 being operatively connected at 59 with the lever 56 so that the operation of either lever by a pin 54 is effective to depress the stop 52 of that denomination, by causing lever 56 to depress a pin 60 protruding from said stop 52.

The denominational rows of stops are separated from each other by means of spacing bars 61, held in position by screws 62 (Figs. 2 and 7) through end plates 65 of the stop basket 36. At their lower ends, the stops 51 and 52 protrude through a plate 64 (Figs. 1A and 7).

If the card in the pin box has no holes in any one row, then the stop 52 will be undisturbed, thereby intercepting a heel 66 at the lowermost extension of the carrier 42.

From the foregoing, it will therefore be understood, that the sensing of a card is effective to set up a condition in any row of stops in the stop basket; and that the connection-box wires will either depress the zero stops upon elevating any other stop in the corresponding row, or the zero stops themselves will remain undisturbed in their initial position and thus prevent effective movement of the rack-carriers.

Figures 2, 3:
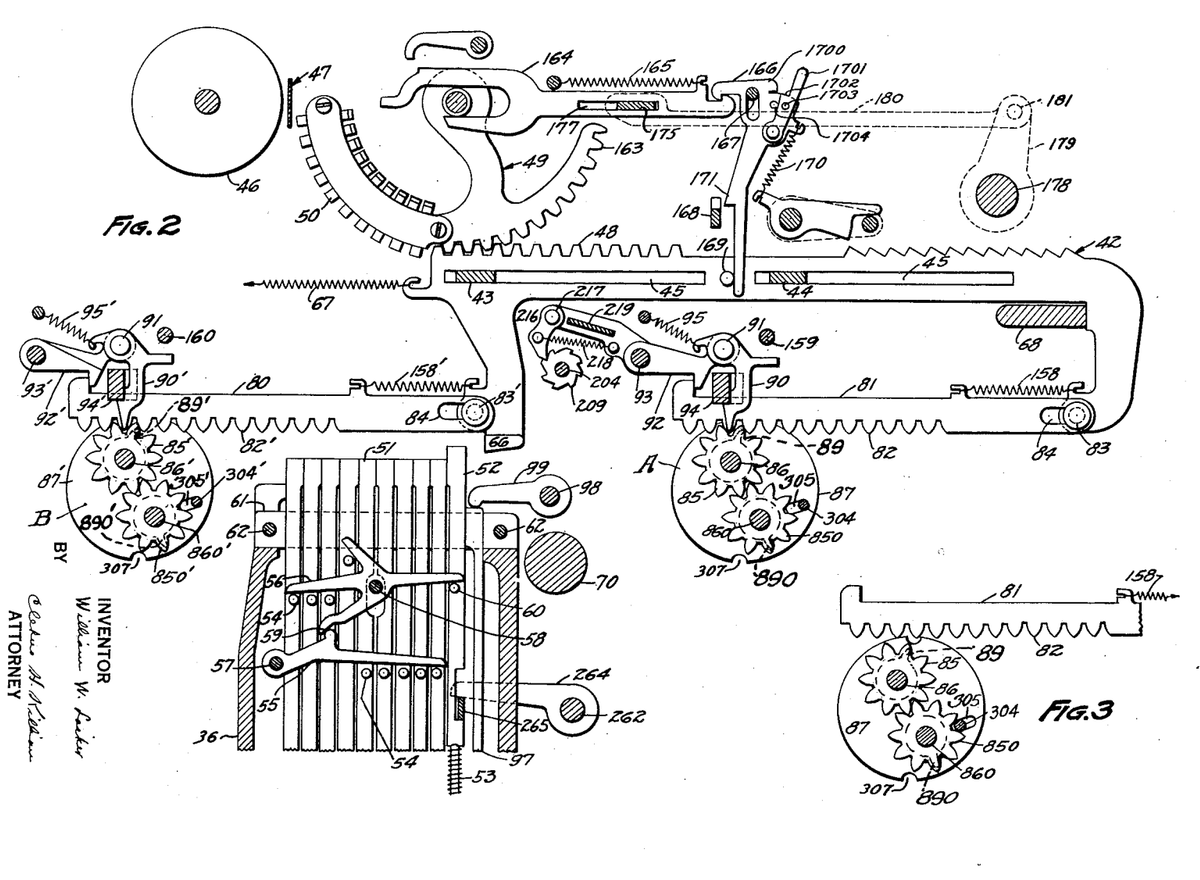
Fig. 2 is a front-to-rear sectional view in elevation of one of the computing units, and an associated part of the connection-box.
Fig. 3 is a fragmentary detail, showing the relative positions of totalizer and rack during forward stroke of the rack in either adding or subtracting accumulation.

Said rack-carriers 42 are under the influence of springs 67 which urge the carriers toward the left in Fig. 2, but the carriers are normally held in their initial position, as shown, by a restoring bar 68. At the proper time, that is, some time after a condition has been set up in the stop basket, the restoring bar 68 is moved forwardly by the operation of a pair of cams 69 (Fig. 8), which are fast to a revolving shaft 70, operatively connected to the main shaft of the machine by means, not shown, but effective to rotate both shafts at the same rate of speed. Said cams are operatively connected with the restoring bar by means of intervening rock levers 71, pivoted at 72 and carrying rollers 73 riding on the peripheries of the cams 69, and by links 74 carried by studs 75 on levers 71 and pivotally connected to the ends of the restoring bar. This mechanism imparts to the restoring bar a parallel and rectilinear motion, the ends of the restoring bar being arranged to slide in elongated slots 77 formed between the end frames 39 and a pair of retaining pieces 78 which are secured to the frames by means of screws 79, as shown in Fig. 8. It will be understood that the restoring bar is positively restored to its initial position by the action of the cams 69 but is moved forwardly under the tension of a pair of springs 76 which hold the rollers 73 against the peripheries of the cams 69.

It will be apparent that upon movement of the restoring bar 68 to the left in Fig. 2, the rack carriers 42 are permitted to move therewith until each is arrested by either the zero-stop 52 or any other stop 51 in the same denominational order.

Each unit is provided with a series of rack carriers 42, and each rack carrier is provided with a pair of racks 80 and 81 (Fig. 2), having teeth 82' and 82 respectively of a pitch corresponding to the spacing of the stops in the stop basket. The racks 80 and 81 are mounted on their carriers by means of studs 83' and 83 respectively and are movable relatively to the carrier by means of slots 84 in the racks, which embrace studs 83, 83'. These slots permit the movement of the racks relatively to the carriers to the extent of one tooth space. In this manner, although the carriers are arranged to move to the extent of ten spaces when permitted, the racks will ordinarily be able to move to the extent of only nine teeth or spaces. This nine-tooth movement of the racks, will, of course, only take place when the ninth stop is raised in the stop basket.

The purpose of this slack connection will be apparent upon further description of the operation of the machine, particularly with reference to carrying or tens-transfer.

From this point on, many of the parts cooperating with racks 80 and 81 being the same, only those cooperating with racks 81 will be described, similar parts cooperating with the racks 80 being given the same reference characters primed.

Figures 5, 6:
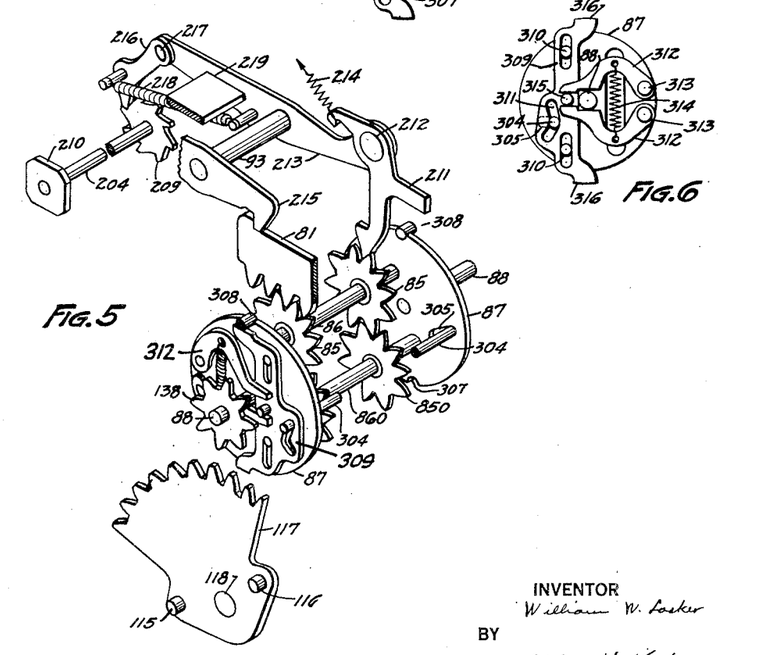
Fig. 5 is a fragmentary perspective view of one of the totalizers, showing the novel mechanisms for determining the character of a balance, and for effecting a transitional carry.
Fig. 6 is detail, showing the mechanism for operating the totalizer detent bar, which bar is shown in the normal position.
Figures 10, 11, 12:
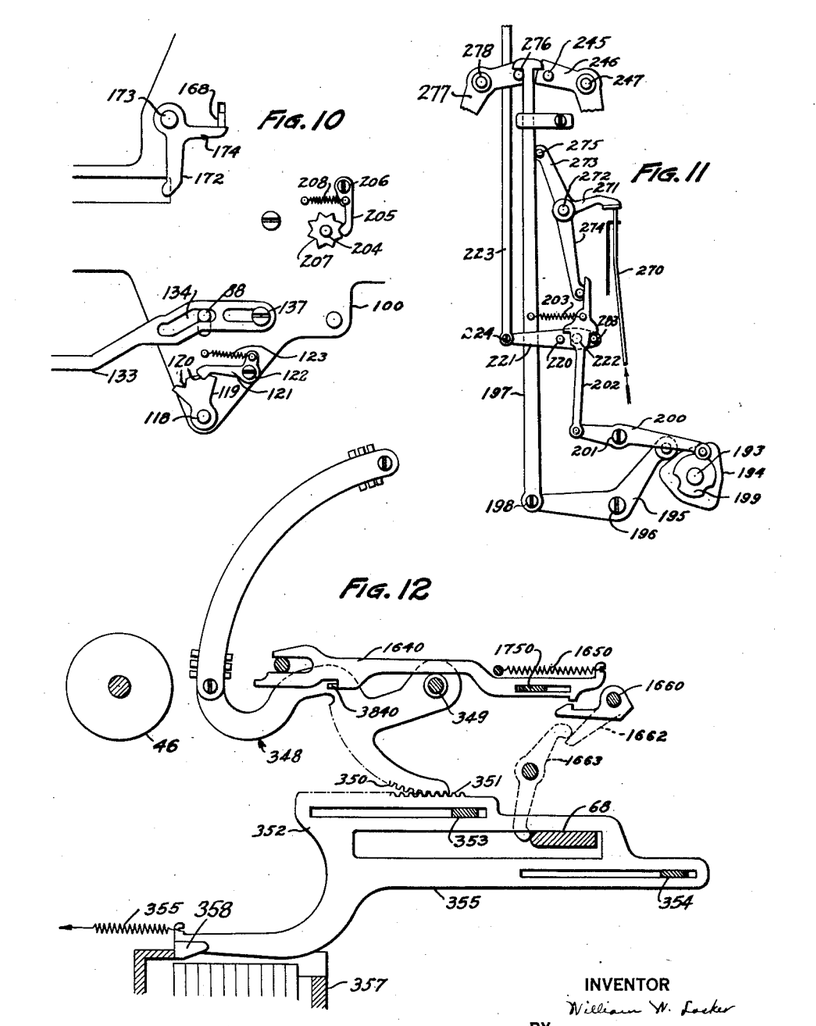
Fig. 10 is a detail, showing means for locking or positioning the totalizer-wheels transposing-mechanism, and for the positioning of the balance determining mechanism.
Fig. 11 shows the grand-total control mechanism in its operated position.
Fig. 12 shows one sector of an alphabetical unit in its operated position.

Each unit is provided with a pair of totalizers, each associated with a set of racks 80 or 81. The totalizers coacting with racks 81 include a series of adding wheels 85, rotatively mounted on a shaft 86 and a series of subtracting wheels 850 mounted on a shaft 860. The shafts 86 and 860 upon which these wheels are mounted are secured to a pair of end plates or discs 87. These end plates together with the shafts and the two sets of wheels are assembled as a unit which is illustrated in Fig. 5. This assembled unit is rotatively mounted on stub-shafts 88, fast to the end plates 87 and the whole assembly is bodily displaceable towards and away from the totalizing racks. This movement is permitted by the ends of shafts being confined in slots in the unit frame 100, as shown in Fig. 10. Gear wheels 85 constantly mesh corresponding wheels 850.

After sensing the card, the pin box is effective to set up a condition in the stop basket, and the racks in each unit are moved until their carriers 42 are brought to the stops 51 or 52. Then, either the adding or subtracting wheels are engaged with the racks, by means of mechanism to be hereinafter described, and the racks are subsequently restored to their initial position by return bar 68, thereby rotating the engaged wheels, amounts equivalent to the number of teeth or spaces that the racks have previously been displaced.

The set of wheels 85 is designed to accumulate the amounts additively entered in the totalizer, while the set of wheels 850 serves as a means for reversely rotating gears 85 to subtractively accumulate the amounts negatively entered. Each wheel 85 and 850 is provided with 10 teeth, and has also a carry tooth 89 or 890 adjacent to one of the regular teeth. This carry tooth serves as a means for sensing whether the totalizer is set for a positive or negative amount, when taking a total. In taking a total, the wheels are first engaged with the racks; and, after having retracted the zero stops in the stop basket, in a manner to be hereinatfer described, the racks are then permitted to move forwardly under the influence of the springs 67 until the carry teeth 89 strikes a series of carry pawls 90, evenly spaced between the computing wheels, and which in total taking, act as total stops. The wheels are then disengaged from their associated racks, and the racks are restored to their initial position by bar 68.

*Tens transfer pawls*

Figure 4:
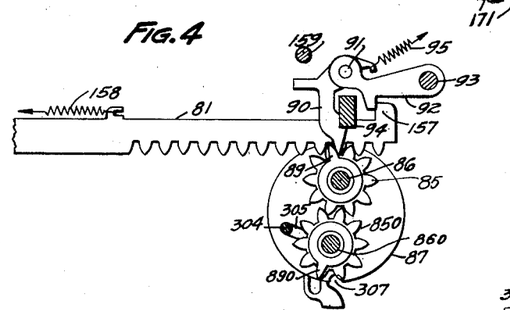
Fig. 4 is a similar view, but viewed from the opposite side, and showing the complementary engagement of the totalizing wheels and the engagement of one wheel with the rack.

The carry or tens-transfer pawls 90 are pivotally mounted on studs 91 carried by rack stops 92, which are in turn pivotally mounted on a shaft 93. Said carry pawls 90 are held in their normal position, as shown in Fig. 4, by means of a cross bar 94 on which they latch, under impulse of springs 95, one spring for each carry pawl. Springs 95 are anchored to a suitable rod.

Fig. 4 shows the condition of one of the totalizers after taking a total, all the computing wheels being aligned according to their respective carry teeth. The two sets of wheels are complementarily geared, that is to say, the carry pawls are so positioned, relatively to each other, that if one set of carry teeth is on one side of the carry pawls, the carry teeth in the other set of wheels if engaged would be on the other side of the carry pawls. Hence, if a total is instigated when the accumulator wheels 85 are in the position shown in Fig. 4, there can be no movement of the racks 81 since the carry tooth 89 is against the carry pawl 90. But if the set of wheels 850 is presented to engagement with the racks, and then a total is instigated, the racks will move nine spaces or teeth or until carry tooth 890 is stopped by carry pawl 90.

*Subtraction*

Normally, all amounts are additively entered in both totalizers, but if the card being sensed is provided with a special hole in line with a subtracting wire 96, (Fig. 1) in the connection box, then the same will be elevated by the rising pin thereunder and the wire in turn will raise a subtraction stop 97 (Fig. 2), in the stop basket. This stop is operatively connected with mechanism for transposing the gears of that unit so that the subtracting gears 850 thereof will be engaged with the racks. The subtraction stop 97 is effective to swing a shaft 98 by means of an intervening arm 99, fast to the shaft 98, which shaft is mounted on the side frames 100 (Figs. 7, 8, and 14) of the unit. The shaft 98 protrudes through said side frame and carries at the end thereof and fast thereto an arm 101, (Fig. 7), which is operatively connected, by means of a pin 102, to a slide 103 which is mounted on the side of the frame 100 of the unit by means of shoulder screws 104. By this train of connections the subtraction hole in the card is effective to move the slide 103 of the desired unit. The slide 103 is provided with two pins 105, fast thereto, for the purpose of controlling the position of a pair of subtraction selecting levers 110 and 110', one for each totalizer. These selecting levers are normally held in the position shown in Fig. 7, by means of springs 106 and are pivotally mounted at 107 on a pair of bell-cranks 108 and 109, which are caused to operate and move the selecting levers 110 and 110' downwardly, during the advancing movement of the restoring bar 68. The two members 108 and 109 are provided with upwardly extending portions 111 and are operatively connected together by a link 112 secured to said bell-cranks by means of screws 113. The action of the restoring bar 68 in its forward movement is to engage a cam surface 114 on arm 109, and thereby swing the arms 108 and 109 anti-clockwise, as viewed in Fig. 7. This will cause selecting levers 110 and 110' to engage pins 115 and 115' or pins 116 and 116' according to the position of the selecting lever, whereby a geared sector 117, which is pivotally mounted on a shaft 118 rotatable in the side frame 100, may be rocked to either of two positions. There is, of course, one of these sectors provided for each totalizer, and its effect on the totalizer is to swing the same through an arc of 180° to thus present either the adding or subtracting set of totalizer wheels to the racks. The shafts 118, which carry the sectors 117 fast thereto, are provided at the other ends thereof with detent sectors 119 (Fig. 10). Each sector has two detent notches 120, which by means of an associated detent arm 121, fulcrumed at 122, and pressed by a spring 123, is effective to position the sector 117, in either its additive or subtractive position, and to maintain the same in such position until positively moved therefrom.

Accumulation in the totalizing wheels takes place during the return movement of the racks, and in the initial position of the machine the wheels are held in engagement with the racks, as shown in Fig. 2, but are thrown out of engagement from said racks during the first portion of the cycle, that is, before the racks start to move, as shown in Fig. 3.

Grand-total totalizer

For reasons which will be apparent upon further description of the invention, although both totalizers of a unit are simultaneously operated into and out of engagement with the racks, each totalizer is provided with independent mechanism for controlling its operation. In Fig. 8, mechanism is illustrated for controlling the operation of the grand-total totalizer, which totalizer is shown in Fig. 1 and will hereinafter be referred to as totalizer "B". This controlling mechanism includes a shaft 1210 rockably mounted in the frames 39, and an arm 1220 fast to the end of said shaft 1210. Said arm is operatively connected at 1230 with a selecting member or selecting link 124, normally held in the position shown in Fig. 8 by a spring 125, anchored at opposite ends to spring pins 126 and 127, respectively, carried by the member 124 and the frame 39. The link member 124 is provided with a pin 128, fast thereto, which is actuated for accumulative operations by a bell-crank 129 pivotally mounted on a stud 130 and operatively connected, by means of an intervening roller 131, with a cam 132 fast to the main shaft 70. This cam 132 is formed to swing the bell-crank 129 at proper times upon operation of the machine, and this swinging movement is effective to rock the shaft 1210 for throwing totalizer "B" out of and into engagement with the actuating racks 80 by means now to be described.

The totalizer "B" is moved into and out of engagement with the rack 80 by means of a pair of cam links 133 (Fig. 7), which links are provided with cam slots 134 through which the shafts 88 of the particular totalizer protrude. Said links 133 are carried by a pair of screws 135 on arms 136 fast to the shaft 1210, and the other ends of the links 133 are slidably mounted on shoulder screws 137 fast to the side frames 100. The sliding movement of these links to the right in Fig. 7, causes the cams of slots 134 to depress pivots 88 so as to disengage the totalizer wheels 85' of totalizer "B" from their associated racks 80, and in so doing, a gear 138 fast to one of the pivot members 88 of the particular totalizer is caused to engage the sector 117. Swinging of this sector by the means hereinbefore described can now rotate the totalizer to present either its adding or substracting wheels to the racks. It will, of course, be understood that spring 1300 (Fig. 8), causes roller 131 to follow cam 132 to return the totalizer to rack-engaging position, after it has been set for adding or subtracting.

Running totalizer

The mechanism just described is for controlling the totalizer "B"; and is similar to another mechanism intended to control the operation of the computing wheels in the running-total totalizer, which will hereinafter be referred to as totalizer "A" and operates to accummulate "totals" and "group-totals" as above defined. This mechanism includes a shaft 139 (Figs. 1, 1A, 7 and 14) rockably mounted in end frames 39, and arranged to be rocked, upon operation of the machine, by means of a selecting link 140 pivotally mounted on a stud 141 carried by an arm 142 fast to the shaft 139. This selecting link is held in the position shown in Figs. 1 and 1A, by means of a spring 143, and in this position presents a pin 1440 in front of a shoulder on a bell-crank 144 pivotally mounted at 145 and provided with a roller 146 arranged to ride the periphery of a cam 147 fast to the shaft 70.

The shaft 139 carries a pair of arms 148 (Fig. 7), fast thereto, which arms are effective, by means of intervening links 149, one on each side of the unit, to control the movement of totalizer "A" into and out of engagement with the associated racks 81. The links 149 are pivotally mounted on studs 150 carried by said arms 148, and are arranged to slide, by means of slots 151, on shoulder screws 152 fast to the frames 100. The shafts 88 of the totalizer "A" are arranged to protrude through vertical slots 155 in frames 100 and cam slots 154 in the links 149, and the movement of the links, toward the left in Fig. 7, is effective to move the totalizer shafts 88, down in slots 155 in the frames 100. The shaft 88 at one end of totalizer "A" is provided with a pinion 156, fast thereto and arranged to engage the respective sector 117. This sector, as seen, may operate to revolve totalizer "A" to present either its adding or substracting wheels to the racks 81. A suitable spring causes bell-crank 144 to follow cam 147 and return totalizer "A" to rack engaging position at the proper time.

Tens transfer

Each rack is arranged to accumulate, either additively or subtractively, the amounts set up in the stop basket, but no amount greater than nine can be thus directly computed in any rack. Mechanism is provided, however, as best seen in Figs. 2–6, for transferring one into a totalizer wheel of a higher order either additively or subtractively when the wheel of next lower order moves from 9 to 0, or 0 to 9 position. This is done by allowing the rack associated with the wheel of a higher order to move one extra space or tooth, while the same is still engaged with the totalizer wheel at the end of the accumulating stroke. To this end, each totalizing wheel is associated with its adjacent rack of higher order by means of the carry pawls 90 hereinbefore referred to. Each time the carry tooth 89 or 890 (Fig. 4) of any totalizing wheel, either additive or subtractive, reaches either the ninth or zero position in accumulating either additively or subtractively, it is ready to trip the pawl 90 of the next higher rack; and, upon further movement of that wheel, does trip the carry pawl 90 of the next higher rack from the position shown in Fig. 4 to a position where bar 94 no longer retains it depressed. The tripping of the carry pawl permits the spring 95 thereof to swing the rack stop 92 associated therewith, out of the path of the lug 157, forming an integral part of the respective rack 81. In this manner, the rack of next higher order to the wheel which has moved either from 9 to 0, or from 0 to 9 position, is permitted to move one space farther than normal home position, under the influence of a respective spring 158, 158', spring 158, 158' being anchored at opposite ends to the racks 80—81 and the carrier 42. This extra movement of a rack will rotate the associated wheel one extra tooth, thus effecting carrying or tens-transfer.

*Resetting the carry pawls*

Since the accumulation takes place during the return movement of the racks, and since, in order that the carry-pawls 90, which are held in their tripped position by the spring 95, may again be rendered operative during the next accumulating stroke, it is necessary to reset the carry-pawls to their initial positions, during the succeeding forward stroke of bar 68. For this purpose, there is provided a pair of resetting bars 159 and 160 (Figs. 2, 4, and 7), the first for the set of pawls of totalizer "A", and the second for the set of pawls of totalizer "B". Said bars are respectively carried by the arms 109 and 108, which are respectively pivoted on studs 162 and 161 fast to the frames 100. It will be understood that there is provided one arm 108 and one arm 109 on each side frame 100 of a unit, in order to impart to said restoring bars a parallel motion, and that the restoring of the carry pawls takes place during the forward movement of the restoring bar 68, simultaneously with the setting of the computing wheels for either adding or subtracting.

*Printing items*

In order that the amounts entered in the totalizers may be listed on the work sheet, there is provided a printing mechanism which is operatively connected with the rack-carriers. Each rack carrier 42 (Fig. 2) has a rack forming an integral part thereof and having teeth 48 arranged to engage the teeth 163 of a type sector 49 associated with each carrier. As each rack-carrier is moved forwardly to the stop set in the stop basket, the sector is positioned to bring a corresponding type 50 in front of the platen, at the printing line thereof; so that a printing hammer 164 may then deliver a blow against the selected type, to effect printing thereby. There is one hammer 164 provided for each type sector, and each hammer is urged toward the platen under the tension of a spring 165, and is normally held back against such tension by a latch 166. The latter is pivotally mounted on a shaft 167, which passes through vertically elongated slots in all of the latches 166. In the initial position of latches 166, as shown in Fig. 2, the operation of a vertically movable releasing bar 168 is ineffective to trip the hammer-latches 166, because the same are normally held away therefrom by pins 169 carried by the rack carriers. However, movement of a rack carrier toward the left in Fig. 2, permits the latch 166 associated therewith to be swung, under the influence of a spring 170, so that a shoulder 171, forming an integral part of said latch, is moved into the path of the bar 168.

The releasing of the hammers takes place at the end of the forward stroke of the restoring bar 68. At this time the bar 68 strikes a pair of bell-cranks 172 (Fig. 7), arranged at opposite sides of the frames 100 of the unit, upon which frames the bell-cranks are pivotally mounted by means of studs 173. Referring to Fig. 7, it will be noted that the bell-cranks are provided with extensions 174 arranged to engage the underside of the bar 168, and raise the same substantially at the end of the initial stroke.

After release the hammers are immediately restored to their initial position by means of a restoring bar 175 (Figs. 2 and 7), which bar is slidably mounted in slots 176 in the frames 100 and extends through slots 177 in the rear end of said hammers. Said restoring bar 175 is fast to one end of each of a pair of links 180 having their opposite ends pivotally connected by shoulder screws 181 to respective arms 179 fixed on a restoring shaft 178, pivotally supported by the retaining pieces 78. The operating mechanism for said restoring shaft 178 may include a pair of arms 182 (Figs. 1A and 8) fast at the ends of said shaft. Links 183 are pivotally mounted at one end on studs 184, carried by arms 182, and connected at their other ends by pivots 185 with cam plates 186 rockably mounted on studs 187 extending from the end frames 39. The cam plates 186 are swung to restore the hammers by means of rollers 188 (Fig. 8) and 189 (Fig. 1A), respectively carried by the cams 132 and 147.

Figure 15:
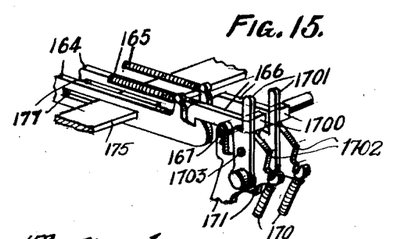
Fig. 15 is a fragmentary detail perspective of two of the automatic-zero devices of the printing hammer mechanism.

Each member 166 (Figs. 2 and 15) is formed with an ear 1700, which is bent to the right as viewed from the front of the machine into the plane of a respective lever 1701, on the member 166 of next lower order, and formed with a shoulder 1702 to cooperate with the high order ear 1700 for automatic filling in of zeros to the right of the highest significant digit. Lever 1701 is shown in Fig. 2 as moved to its ineffective position, in which case the printing is "split" at that point. If lever 1701 is moved toward the left until extrusion 1703 enters the hole 1704, the printing will be normal.

*Taking a total*

In taking a total, the totalizer wheels are first engaged with the racks preparatory to moving the racks forwardly so as to reversely rotate the totalizer wheels to bring the carry teeth thereof against the carry pawls, as shown in Fig. 4. The pawls 90 thus act as total stops, and stop the racks, rack carriers and type segments in positions representing the digits of the total taken. In this manner, each rack is moved a number of teeth equal to the number of teeth intervening between the carry tooth of the respective totalizing wheel and its associated carry pawl; and when the corresponding types on the type bars are positioned at the printing line, the hammers 164 are released and the amount represented by the type-bars is printed on the work sheet.

When a considerable amount is first additively entered in the totalizer, and a smaller amount taken subtractively therefrom, by means of the subtracting totalizer wheels, a positive balance or total stands on the totalizer; and the total is taken from the set of adding wheels 85. In this case the subtracting wheels are only used to reverse the rotation of adding wheels for item subtracting. Sometimes, however, it is desired to subtractively enter an amount in the totalizer which is greater than the amount previously entered additively, such as, for instance, when an account is overdrawn. In this case, it is desired that the true overdraft or algebraic difference shall be printed on the work sheet.

According to the present invention, the series of totalizers "A" are automatically cleared when the designation changes in a pre-selected designating field of the computing cards, and the series of totalizers "B" which hold the grand-total of the amounts cleared from the totalizers "A", can only be cleared by means of a non-computing card having special perforations, or by other means under the control of the operator of the machine.

The nature of the accumulating mechanism is such that some of the carry pawls may be unlatched at the end of an accumulating cycle, so that the totalizers must first be normalized before taking the total. Since each accumulation may involve tripping of the carry pawls, and since the total is taken by aligning the carry teeth of the computing wheels against the carry pawls, it is obvious that the carry pawls must first be positioned in their initial position prior to taking a total. Not only that, but the overdraft condition of the totalizers, if present, must first be ascertained, and the subtracting wheels 850 must be brought into co-operation with their racks if an overdraft or negative balance has been accumulated in the wheels.

The Powers machine is so designed that, upon a change of designation in the pre-selected designating field, the card is automatically held in the pin box during a non-computing cycle in order to permit the accumulating mechanism to be conditioned for a total taking operation. This is fully set forth in my said pending application S. N. 538,429, and Belgian Patent No. 382,387. Briefly, the upper pin box 31 is provided with a separate slide 190 for each row of pins 29, and each slide is operatively connected with the pins of its row by means of projections 191 forming integral parts of the pins and engaging in cam slots in said slides, as seen in Fig. 1. A pre-selected row or rows of pins is, or are, operatively associated with a trip bar 1911 by means of levers 192 fast thereto, and when a change of designation takes place in said pre-selected row or rows, the change of position of any pin in the row or rows, is effective to move a slide 190, and thus cause the shaft 1910 to be rocked. This rocking of the shaft 1910 is effective to release operating mechanism, not shown, but operable to partly rotate a shaft 193 (Figs. 1 and 11), carrying a plurality of cams fast thereon. Said operating mechanism includes a pawl and ratchet arrangement, not shown, but operatively connected with the main shaft 20. After releasing this operating mechanism, each revolution of the main shaft is effective to feed one tooth of a ratchet wheel having nine teeth until three teeth have been fed. This ratchet wheel is fast to a shaft 193, and the first tooth movement of the ratchet wheel is effective, by means of an intervening cam, to prevent the operation of the card stop 11 so as to hold the computing card between the pin boxes, and also to disable the card feed and prevent feeding of new cards to the pin boxes while the other card is held therebetween. This is the clearing stroke preparatory to the total taking stroke.

The second tooth movement of the ratchet wheel causes a total control cam 194 (Fig. 11), also carried by the shaft 193, to rock a lever 195, pivotally mounted at 196 and to pull downwardly a total control link 197 which is operatively connected with the lever at 198. This sets the computing mechanism for a total operation in a manner to be hereinafter described.

The third tooth movement of the ratchet wheel brings all the cams on the shaft 193 to their next succeeding "initial" position, and, after registering the computing card which initiated the space-total cycles, the same is permitted to leave the sensing chamber, and as the feeding mechanism has been rendered effective again, a new card is fed to the sensing chamber in the regular manner. This third tooth or final movement is also effective to disconnect the ratchet operating mechanism, which is subsequently stationary until a new change of designation causes the shaft 1910 to be rocked again. It will be understood that although the ratchet wheel is provided with nine teeth, the releasing of the feeding mechanism is only effective to feed three teeth of the ratchet, and that the cams are provided with three identical cam surfaces. In this manner each portion of the cam has three positions, and is effective to operate and restore its associated mechanism.

In order to permit unobstructed movement of the computing racks during the total stroke, while the computing card is being held in the pin box, the Powers machine is provided with mechanism for automatically disabling the operation of the pin locking slides 32 during both the space and the total strokes. Hence, the upper pins are not held up during said strokes; but during the stroke following the total, the locking slide is again normalized or rendered effective to lock the upper pins in the regular manner, and the amount on the card is registered in the totalizers.

When a negative balance or overdraft is accumulated in any one of the totalizers, the total or grand-total is taken from its set of subtracting wheels, but if the amount accumulated is a positive balance, then the total or grand-total is taken from the set of adding wheels. However, since the positioning of the wheels takes place during the forward movement of the computing racks, and since the total or grand-total is obtained during the forward movement of the racks, it will be apparent that the selection and positioning of the proper set of totalizer wheels for a positive or negative balance, must take place during the idle or spacing stroke before a total or grand-total. To this end, the shaft 193 is provided with a cam 199 (Fig. 11), fast thereto, which cam is operatively connected, with a vertically disposed link 202 by means of an intervening lever 200 pivotally mounted at 201. Said cam is shown in its initial position in Fig. 1, and the link 202 is normally held in the position shown by means of a spring 203, which also holds the link 197 in its normal position as shown in said Fig. 1.

Attention is now directed to the computing mechanism, and more particularly to Figures 2, 4, and 5. In all these figures the adding wheels are shown in their operative or rack-engaging position, and as long as the accumulated amount is positive, that is to say, not less than "0", the overdraft mechanism will remain in normal position, and a shaft 204, rotatably mounted in the frames 100 will be held in the position shown in Fig. 5, in which position it is held by a detent 205 (Fig. 10), pivotally mounted at 206 and held in resilient engagement with a star wheel 207 by means of a spring 208. The star wheel is provided with eight teeth or positions, corresponding to the eight teeth of a ratchet wheel 209 also carried by the shaft 204. The other end of said shaft 204 is provided with a balance selecting cam 210.

Transitional carry

Each time an amount is substracted from "0", the substracting wheels are engaged with the computing racks, and, upon accumulating any significant amount, a tripping of all carry pawls will take place. This is so, because a zero in each of the adding set of wheels means that the associated substracting wheels will stand with "9" relatively against the carry pawls and is due to the two sets of wheels being complementally geared, as hereinbefore set forth. Upon carrying across, the computing wheel of highest numerical order is effective to trip its carry pawl 90 (Fig. 5) which is pivotally mounted on a stud 91 carried by a lever 213 pivotally mounted on the pivot shaft 93, and the tripping of said carry pawl 90 permits a spring 214 to actuate and to swing the lever 213, and thus rock a units-denomination rack-stop 215 which is rigidly connected with the said lever by means of a crossmember 219. This swings the units-denomination rack-stop away from the rack of lowest order and permits the same to be moved one tooth space by its associated spring 158. In this manner a transitional-carry is effected, and the "fugitive one" is held in the totalizer preparatory to taking a negative balance from the substracting set of totalizing wheels.

The tripping of the carry-pawl 211 is also effective to condition the negative balance selecting mechanism for a negative total. To this end the lever 213 (Fig. 5), is provided with a pawl 216 pivotally mounted at the rear end thereof on a stud 217, and the pawl is arranged to engage the ratchet 209 against which it is held by a spring 218. It will be seen that the tripping of the carry pawl 211, and subsequent swinging of the lever 213 will rotate the shaft 204 one-eighth of a turn, and thus change the position of the cam 210 from the position shown in said Figure 5 to the position shown at the left side of Fig. 7.

Referring again to Fig. 1, it will be noted that the link 202 is normally hooked over a pin 220, on a lever 221 pivotally mounted at 222, and that said lever is operable by downward movement of pin 220, to pull downwardly a link 223, carried by a stud 224 fast to the free end of said lever 221. Said link 223 is operatively connected, at 227 with a three-armed lever 225 (Fig. 1A), which lever is pivotally mounted at 226. Lever 225 is provided with a rearwardly extending arm 228 and a downwardly extending arm 229 respectively connected, by means of pin and slot connections 230 and 231, with links 232 and 233, and which links are in turn operatively connected, by means of arms 234 and 235 to shafts 236 and 237 journaled in the frames 39.

Owing to the pin-and-slot connection between the lever 225 and the links 232 and 233, the downward movement of the link 223, during the idle stroke preceding a total, is effective to move the link 232 upwardly, to thereby rock the shaft 236, but this movement of the link 223 has no effect upon the link 233.

Referring to Fig. 7, it will be seen that the shaft 236 is provided with an arm 238 which is operatively connected, by means of a pin-and-slot connection 239 and a spring 240, to a horizontally disposed link 241 slidably mounted on a stud 242 secured to the side frame 100. The operation of the arm 238 is effective to pull upon the spring 240. If the position of the cam 210 is as shown with relation to link 241, in said Fig. 7, one of the low points of the cam will permit movement of a finger 243 formed on link 241; but if the cam is normal or turned one-eighth of a rotation from the position shown, one of the high points of the cam will interpose and prevent movement of the finger 243 of said link 241, thereby preventing the movement of the link itself. In the condition shown, a negative balance has been computed in the totalizer "A", and the shaft 204 associated therewith has therefore been rotated through tripping the carry pawl 211, so that one of the flats or low parts of said cam is in the path of the finger 243; and in this case, the link 241 will be permitted to move under the influence of the spring 240, upon operation of the shaft 236. The movement of said link is effective to swing the selecting lever 110 to its subtraction position by means of a pin 244 carried by said slide and arranged to engage the side of said lever 110 so as to move the same therewith.

From the foregoing, it will be understood that, during the idle stroke, the position of the cam 210 will determine if the shaft 236 is to be effective to position the selecting lever to its subtraction position or if the lever is to remain in its normal or adding position in which case spring 240 is merely strained. It will also be understood that the positioning of the selecting lever 110 takes place at the same time that a condition is ordinarily set up in the pin box, before the operation of the restoring bar 68 which operates to move the selecting lever 110 downwardly to effect positioning of the totalizing wheels, so as to present the subtraction set of wheels to the computing racks if a negative balance is present in the totalizer.

The first-tooth movement of the shaft 193 (Figs. 1 and 11) is, therefore, effective to select whether the adding or subtracting wheels will be presented to the computing racks during the total-taking operation; but the total cam 194, although rotated one-tooth space during the idle stroke, does not operate the lever 195 until the second-tooth of the ratchet on said shaft is operated. At this time, the link 197, which is provided with a hook at the upper end thereof, engages a pin 245 carried by a lever 246 pivotally mounted on a stud 247. This rocks the lever 246 which is provided with a depending extension to which one end of a link 248 is pivotally connected at 249. The other end of the link 248 is operatively connected at 251 (Fig. 7) with a lever 250 loosely pivoted on the shaft 1210. Said lever 250 has an arm 252, having a pin 253 fast thereto, which is disposed to engage one side of the lever 136, to thereby rock the shaft 1210, and by so doing, move the links 133 in a manner to disengage the wheels in the totalizer "B" from the computing racks.

In addition to this, the rocking movement of the lever 250 (Fig. 7), is effective, by means of an extension or finger 254, forming an integral part thereof, to depress a pin 255 carried by a bell-crank 256 fast to a shaft 257 which extends between, and is pivotally mounted in, the end frames 39. The upwardly extending arm of the bell-crank 256 carries at the end thereof a stud 258, upon which one end of a link 259 is pivoted. The other end of said link 259 is pivoted a pin 260 carried by another bell-crank 261 which is secured to a shaft 262 and is provided with a finger 263 (Fig. 7). Finger 263 and a finger 264, (Fig. 2), also fast on shaft 262, but at the other side of the stop basket, operate a cross-bar 265 designed to engage and depress all the zero stops 52 and thereby permit the unobstructed operation of the rack carriers 42 for total-taking.

In addition to this, an arm 266 (Figs. 1 and 1A), which is secured to the shaft 262, at the end thereof is operated to position the link 148, so that the pin on said link will be in the path of a shoulder on a bell-crank 267, similar to the bell-crank 144 but having a delayed operation. In this manner, when taking a total, instead of disengaging the wheels of totalizer "A" from the racks at the beginning of the forward stroke, they are held in engagement with the racks during the forward movement thereof, so as to sense the position of each wheel relatively to its carry pawl, and then, at the beginning of the return movement, just after printing, but before the racks begin to be restored, the wheels of totalizer "A" are disconnected from their associated computing racks. This means for disconnecting the gears is controlled by said bell-crank 267 which is pivotally mounted at 268 and is rocked by the cam 147, upon the periphery of which a roller 269, carried by said bell-crank, is riding.

From the foregoing it will be understood, that the sensing of a total in the pin box will first set up and operate mechanism to position the computing wheels of the totalizer "A", for either a positive or negative total, it will then render the totalizer "B" ineffective by holding the wheels away from the racks, it will operate the zero stops to clear the rack carriers, when the rack carriers move forward during the totaling-cycle, it will leave the wheels of the totalizer "A" in engagement with the racks until the forward movement is complete, it will then print the total thus taken from the computing wheels, and finally it will disconnect the wheels from the computing racks previous to returning the racks to their initial positions, thus leaving totalizer "A" cleared.

*Grand total*

In order to take a grand-total and clear the totalizer "B", that is, to take a total from the computing wheels thereof, it is necessary to insert a total card in the receiving magazine, usually, although not always, at the end of the pack of computing cards being tabulated. The total card is provided with a special perforation for tripping the total mechanism in a manner similar to that shown in the cited application S. N. 538,429 for the tripping of the mechanism when there is a change in the designating field of the card. Such card is also provided with a special perforation through which a wire 270 (Figs. 1 and 11), in the connection box, is operated. Upward movement of wire 270 rocks a lever 271, pivoted at 272, which lever is provided with an upwardly extending arm 273 and a downwardly extending arm 274. The upper arm 273 is provided with a pin 275 fast thereto, which pin is arranged to engage one side of the link 197. Operation of said wire 270, is, therefore, effective to swing the link 197 to the position shown in Fig. 11, and thus engage the hook at the upper end of this link with a pin 276 carried by an arm 277 pivotally mounted at 278. In this manner, the operation of the total link 197 by cam 194 is effective to rock said arm 277 instead of the arm 246, and thereby rock shaft 139 by means of a link 279. Link 279 is pivotally connected at 280 (Fig. 1A) to a lever 281 freely pivoted on the shaft 139, and is pivotally connected to the arm 277 by means of a stud 282.

During the idle stroke preceding the taking of a grand-total from the totalizer "B", it is desired to first ascertain the condition of the totalizer, that is to say, whether the total or balance accumulated therein is positive or negative. To this end, the rocking of the lever 271 is effective, in addition to positioning the link 197 as hereinbefore set forth, to position the link 202 in a manner such as is shown in Fig. 11. This will engage the hooked upper end of said link with a pin 283 carried by the arm 221, and the downward movement of the link 202 upon operation thereof by cam 199, will rock the arm 221 so as to move the link 223 upwardly instead of downwardly. This reverse movement of the link 223 will, of course, be effective to rock the lever 225 (Figs. 1 and 1A), anti-clockwise, and the operation of the arm 229 will actuate the link 233 to rock shaft 237.

Referring more particularly to Fig. 7, it will be noticed that the shaft 237 is arranged to control the position of the selecting lever 110', through intervening mechanism which includes an arm 284 having a pin arranged to slide in a slot 285 in a link 286, which is slidably mounted on a shoulder-screw 287, fast to the side frame 100. Said link 286 is flexibly connected with the arm 284 by means of a spring 288, and, although the arm 284 is actuated during the idle stroke preceding the taking of a grand-total from the totalizer "B", the link 286 will not move if the cam 210 for the "B" totalizer is in the position shown in Fig. 7. In the case shown, the cam will intercept a finger 289 formed on link 286, thereby insuring the taking of the grand-total from the adding wheels of totalizer "B." If, however, the position of the cam 210 is such that it does not interfere with the operation of the link 286, showing the grand-total to be negative, then the link 286 will move under the urging of the spring 288 and will thus swing the selecting lever 110', by means of a pin 290 on said link, to its subtraction position. Having thus positioned the selecting lever to the negative balance position, the forward movement of the restoring bar 68 will position the totalizing wheels in the regular manner.

During the total stroke in a grand-total taking operation, the rocking of the lever 281 (Fig. 7) by link 197 will swing its upper arm 291, which carries a pin 292 against arm 148, rocking it to disengage totalizer "A", and hold it through slide 149 ineffective during the taking of the grand-total. Rocking of the shaft 139 by arm 148 will also rock the shafts 257 and 262 by means of links 259 and 294, the latter pivotally mounted on studs 295 and 296, respectively carried by the lever 261 and said arm 291 (Fig. 7).

The operation of the shafts 262 and 257 will respectively be effective to move the "0" stops downwardly and thus permit the operation of the rack carriers; and to swing the selecting link 124, from the position shown in Fig. 8, to a position in which the pin 128 thereof will be in the path of a shoulder on a bell-crank 297 instead of the bell-crank 129. Said bell-crank 297 is pivotally mounted on a stud 298 and is operatively connected with the periphery of the cam 132 by means of a roller 299. By changing the position of the selecting link 124, the action of the shaft 1210 is delayed and in this manner the wheels in the totalizer "B" are held in engagement with their racks during the forward movement thereof, and, by the action of the cam 132, the same are disengaged from the racks just before the racks start to return to their initial position, thus effecting the taking of a grand-total and leaving totalizer "B" cleared. The selecting link 124 is connected to the shaft 257 by means of an arm 300, which is fast on shaft 257, and a link 301 having opposite ends pivoted at 302 and 303 to the link 124 and the arm 300.

Totalizer detents

In order that the computing wheels may be held in registering position when out of engagement with the computing racks, there are provided aligning or detent bars 304, 304', (Figs. 2–6), which are slidably mounted in radial slots 305 in the discs 87. These bars are held in engagement with the wheels while the wheels are free from the racks, but are automatically disengaged upon engaging the wheels with the computing racks. The totalizer, that is, the two sets of wheels, which are mounted on shafts 88 carried by a pair of discs 87, is held against displacement during accumulation and during the taking of a total by means of pins 308 which are fast to the side frames 100 and are designed to engage notches 307 in said discs 87, there being notches 307 in each disc 87 to accommodate it to both adding and subtracting positions. Upon disengaging the wheels from their associated racks, however, the totalizer will be moved away from the pins 308, and the pinion 138 will be thrown into engagement with the associated sector 117 so as to position the totalizers for either a positive or a negative operation according to the next card sensed.

The detent bar 304 is operated by a pair of cam plates 309, (Fig. 6) which are slidably mounted on studs 310 fast to the discs 87, and are provided with cam slots 311 designed to control the ends of the bar 304, which protrude through the radial slots 305, in the discs 87 into the cam slots 311. Cam plates 309 are held in their normal position by centralizing arms 312, at each end of the totalizer. Arms 312 are pivotally mounted on discs 87 at 313 and are held in central position by means of springs 314. This holds the aligning bar in engagement with the computing wheels; but upon moving the totalizer to engage the wheels with the racks, the ends 316 of the cam plates, (regardless of whether it is an adding, subtracting or totaling operation), are caused to strike pins 308, as shown in Fig. 5, thereby sliding the cam plates 309 and causing the detent bar to be moved away from the wheels. This permits the free rotation of the totalizing wheels when the same are engaged with the racks. Since the detent-bar holds the wheels when the same are not in engagement with the racks, it will be understood that the wheels are held against displacement during the swinging of the totalizer from adding to subtracting position and vice versa.

Sign printing

Each computing unit is provided with a character or sign-printing bar for indicating the character of the computation, the totalizer from which the total is taken, and whether the total printed is positive or negative.

To this end the sign type-segment 318 (Fig. 13) is provided with plus and minus sign types to indicate if the amount computed has been entered additively or subtractively, types "+A" and "+B" to indicate positive total and positive grand-total, respectively, and types "−A" and "−B" to indicate negative total and negative grand-total, respectively. The mechanism for accomplishing this result includes a series of levers, which serve to position a slide 317 (Fig. 13), which is connected to a type segment 318 carrying the character signs. During the normal operation of the machine the slide 317 is arranged to move forwardly under the influence of a spring 324; and, if the slide 317 is not arrested by any of its associated stop members, the same will go to its extreme position permitted by the bars 43, 44 upon which it is mounted, and, by positioning the last character type to the printing line, the plus sign will be printed. If, however, an amount is entered subtractively, then the rocking of the shaft 98, as above described, will raise a stop member 319, which is slidably mounted on a stud 320 and is carried by a pin 321 on an arm 322 fast to said shaft 98. When raised, member 319 will be in the path of a stop shoulder 323 formed on slide 317, and the slide will be positioned thereby to bring the uppermost type on the type-segment 318 to printing position for printing a minus sign.

Figure 13:
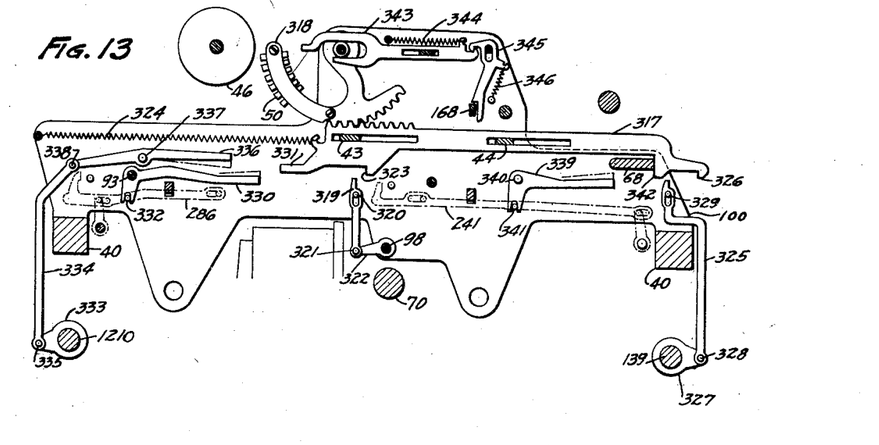
Fig. 13 shows the sign-printing character-bar and operating mechanism therefor.

Upon taking a total from the totalizer "A", if the same is positive, then the slide 317 will be arrested by a stop member 325, which is raised into the path of a stop shoulder 326 upon rocking the shaft 139. This will position the character for printing the type No. 3, and indicates that a positive total is taken from the totalizer "A". Member 325 is connected to the shaft 139 by an arm 327 to which it is pivoted by a stud 328; and the link is slidably supported by a stud 329 fast to the frame 100.

If, instead of a positive total, the total or balance is negative, then the slide 317 is arrested by a lever 330 which is moved into the path of an extension 331 of the slide, and the sign segment 318 will be positioned for printing by the type No. 2, having a character indicating that a negative balance has been taken from the totalizer "A". The lever 330 is moved upon operation of the link 286 to which it is connected by a pin 332. The lever 330 is pivotally supported on the shaft 93.

The total taken from the totalizer "B" usually represents a grand-total, that is to say, an accumulation of a plurality of the totals cleared from the totalizer "A". This grand-total may also be either positive or negative, and means are provided for indicating the character of the grand-total on the work sheet. Rocking of the shaft 1210, having an arm 333 fast thereto, operates a link 334 mounted upon the arm 333 at 335, and the link rocks a lever 336 pivoted at 337 and pivotally connected with the link 334 at 338. Lever 336 is arranged to intercept the extension 331 and thus position the character-segment for printing by type No. 5, which indicates that the total is a positive balance or positive grand-total taken from the totalizer "B".

When the grand-total computed in the totalizer "B" is negative, then the link 241 will operate, and its movement is effective to swing a lever 339 pivotally mounted at 340, and operatively connected with the link 241 by means of a pin 341. The rocking of the lever is effective to intercept a stop shoulder 342 of the slide 317, and thus the slide 317 is positioned to print by the type No. 4. This type will print a character which indicates that a negative balance or negative grand-total is taken from the totalizer "B".

The slide 317 is restored by the restoring bar 68 in the regular manner. The printing mechanism for this character bar includes a hammer 343 actuated by a spring 344 and a latch 345 actuated by a spring 346, which latch holds the hammer in inoperative position. Said latch is operated at the end of the forward stroke to release the hammer by means of the regular release bar 168 and is operated at every reciprocation of bar 168.

The alphabetic non-computing units

In addition to the numerical units hereinbefore described, the machine is provided with one or more alphabetical non-computing units for designating the character of the computations entered on the work sheet, or printing any desired descriptive matter. It is one of the features of this invention that both the numerical and alphabetic units are interchangeable; that is to say, either unit can be substituted for the other without making any substantial change in the rest of the mechanism. This is advantageous, because this class of machines serves a diversified trade, and the broad range of work to which such machines are dedicated renders standardization difficult, if not impossible.

Figure 9:
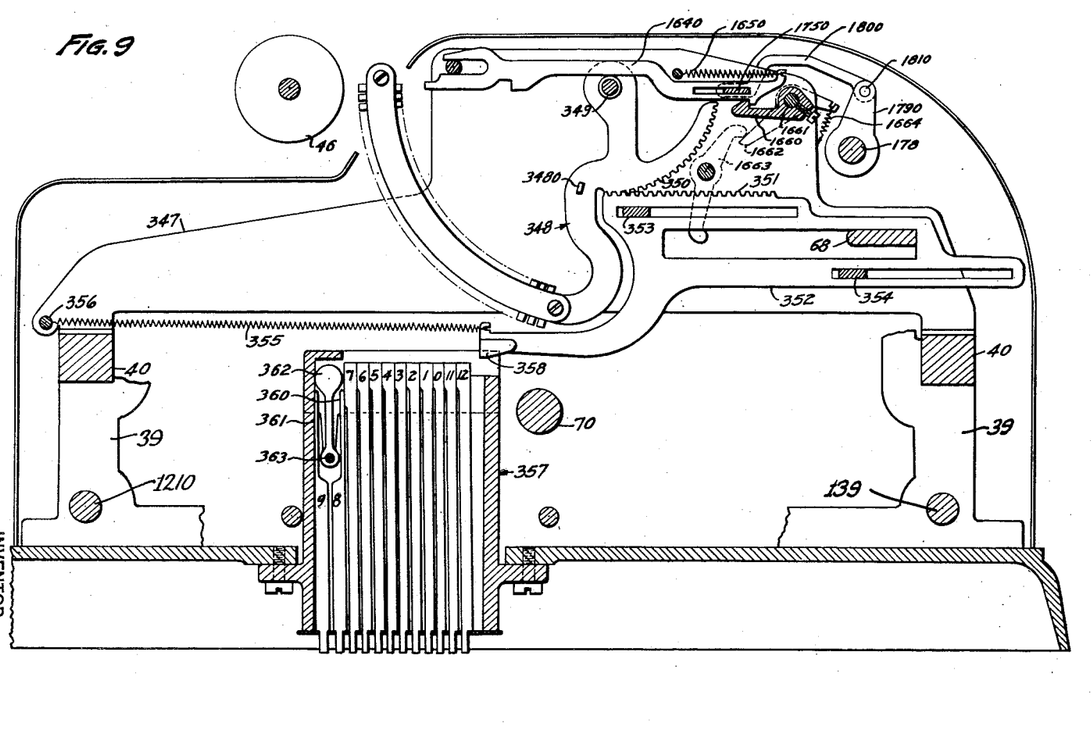
Fig. 9 is a side view, in elevation, showing one of the alphabetical units and an associated part of the connection-box.

The alphabetic units include a pair of side frames 347 (Figs. 9 and 12), which are secured to the cross-bars 40. Between these side frames, there is provided a series of type sectors 348 pivoted at 249, and the sectors are operatively connected, through a geared section thereof having teeth 350 engaged by racks 351 forming an integral part of slides 352 which are slidably mounted on the cross bars 353 and 354. Said slides are urged forwardly by springs 355 secured to a cross-bar 356, and the slides are restored by the restoring bar 68 to their initial position, as shown in Fig. 9. The slides are arranged to travel rectilinearly an amount equal to the travel of the slides 42 of the numerical units, and, since the arc of the geared section of the alphabetical sectors is the same as in the numerical sectors, it will be apparent that the angular movement of both the numerical and alphabetical sectors is also the same.

Each alphabetical type-sector is provided with thirty types which are arranged from top to bottom in the following order: A, B, C, D, E, F, G, H, I, J, K, L, M, N, O, P, Q, R, S, T, U, W, X, Y, Z, 3, 4, 7, 8, and 9. The letter G is designed to resemble the numeral 6, and the same character is indiscriminately used for either the letter G or the numeral 6. The letters I, O, and Z are also altered to resemble the numerals 1, 0, and 2, respectively, and each is indiscriminately used instead of the other. The letter U is slightly altered to resemble the letter V, and the character is indiscriminately used to represent either letter. The letter S is made somewhat like a 5 and the same type operates for either character.

By means of this arrangement of characters it is possible, not only to type a complete alphabet, but it is also possible to print non-computing numerals from a type-segment having only thirty types.

The thirty different printing positions of each alphabetical-sector are controlled by a row of stops in a stop basket of novel design, generally illustrated by the numeral 357 (Figs. 9 and 12). Said row of stops is controlled by a row of non-computing wires in the connection-box, which are, in turn, operatively connected with the holes in the card. Fig. 9 illustrates the normal or initial position of the parts of the alphabetical unit. If no stop is operated to arrest the type bar, then the same will be moved to the end of its travel as shown in Fig. 12.

The twelfth hole in the card is effective to raise the stop 12 in the path of a heel 358, forming an integral part of the slide 352. This will position the type No. 3 of the alphabetical-sector to the printing line and the character C will be printed upon the work sheet. Like operation of the successive stops 11, 0, 1, 2, 3, 4, 5, 6, and 7 will be effective to respectively position the alphabetical-sector for printing the characters F, I, L, O, R, U, Y, 4 and 9; that is to say, the stops will control the position of the alphabetical-sectors so as to print the third character from the top of the bar and every third character in the bar.

The 8 and 9 stops, as shown in Fig. 9 are formed with narrow upper ends 360 and 361, this narrowed portion being in each case one-third the thickness of the stops 0–7, 11 and 12. A spreader 362, pivoted at 363, is normally interposed between the 7 stop and the frame of the connection-box. If, now, any one of the regular stops 0–7, 11 and 12 and the 8 stop are both up simultaneously, the regular stop will be crowded one-third its thickness to the right in Fig. 9 and will stop the carrier 352 that much earlier in its travel. Also simultaneous operation of any one regular stop, and both the 8 and 9 stops, will crowd the regular stop two-thirds of its thickness toward the right with results accordingly. If then, in addition to elevating the 12 stop, the 8 stop is also raised, the 8 stop will shift the position of the 12 stop one-third of its thickness and, instead of positioning the alphabetical-sector to print the letter C, the letter B, or second type on the type-sector will be brought to print. Similar successive operation of the stops, in combination with the 8 stop, will be effective to print the following characters: E, H, K, N, Q, T, X, 3, and 8. If the 9 stop is raised in addition to the 8 stop and any other of the controlling stops, the latter will be shifted two-thirds of its thickness, and then the following characters will be printed upon successive operation of the controlling stops: A, D, G, J, M, P, S, W, Z, and 7.

As shown in Fig. 9, the alphabetical types are driven to print by hammers 1640, urged toward the types by springs 1650; and returned to normal by a bar 1750 operated by links 1800 pivoted at 1810 to rock arms 1790 fixed to shaft 178 so as to rock therewith. All of the hammers 1640 are normally retained in set position by a common latch 1660 fixed on a shaft 1661 and urged toward latching position by a spring 1664. Fixed to shaft 1661 is a rocker 1662 adapted to be operated by a lever 1663 to unlatch the hammers 1640 and permit them to fire. The lower end of lever 1663 extends into the path of return bar 68 so that printing will be effected substantially at the end of the forward stroke of each cycle. A stop 3480 on each sector 348 will prevent operation of the associated hammer 1640 if the carrier 352 moves beyond all the stops so as to move all types above the hammer.

The reason all hammers of this section have a common latch 1640, instead of separate latches, as in the numerical units, is that it is desired to have an impression in all columns so as to prevent changes of the code afterwards, hence, in the uncontrolled columns, an asterisk or other "fill-in" character is printed. In case this safeguard is not needed, the special type is removed and no printing occurs in uncontrolled columns.

The simplicity of construction and cheapness of manufacture will recommend themselves to all skilled in the art.

While I have described what I deem to be the best form of embodiment of my invention, it is obvious that this is merely illustrative, and that variations may be resorted to without departing from the spirit of my invention. I, therefore, do not limit myself to the precise embodiment shown and wish to be limited only by the scope of the appended claims.

I claim:

1. The combination of an adding wheel, a subtracting wheel meshing therewith and diametrically opposed thereto on a common support, a common actuator therefor, card sensing means, card controlled means for revolving said common support to bring either of said wheels into effective relation with said actuator, and means for moving said support to effect engagement of the effectively positioned wheel with said actuator.

2. The combination of a set of adding wheels, a set of subtracting wheels meshed with said adding wheels and disposed diametrically opposite thereto on a common support, common actuating means for said sets of wheels, card controlled means for revolving said common support to bring either set of wheels into effective relation with said actuating means, and additional card controlled means for retaining said common support in either of two effective positions for a plurality of cycles.

3. The combination of a set of adding wheels, a set of subtracting wheels meshed therewith and disposed in diametrical opposition on a common support, common actuating means for said sets of wheels, means for rotating said common support to bring either of said sets of wheels into effective relation with said actuating means and record-sensing means for automatically controlling the said means for rotating said common support.

4. The combination of a set of adding wheels, a set of subtracting wheels meshed with said adding wheels, common actuating means for said sets of wheels, a rotatable frame carrying both of said sets of wheels, said sets of wheels being disposed in diametric opposition thereon, automatic means for rotating said frame to bring either of said sets of wheels into effective relation with said actuating means, and means for moving said frame bodily to effect engagement of the wheels selected by said automatic means with said actuating means.

5. The combination of a set of adding wheels, a set of subtracting wheels meshed with said adding wheels, common actuating means for said sets of wheels, a rotatable frame carrying both of said sets of wheels, said sets of wheels being disposed in diametrical opposition thereon, record-controlled means for rotating said frame to bring either of said sets of wheels into effective relation with said actuating means, and means for moving said frame bodily to effect engagement of the set of wheels selected by said record controlled means.

6. The combination of record sensing means, change of designation sensing means, a set of adding wheels, a set of subtracting wheels meshed with said adding wheels, actuating means associated with each said set of wheels, means for moving said sets of wheels to bring either of said sets of wheels into effective relation with said actuating means, means associated with said record sensing means for automatically controlling the second said means during item entering, and means controlled by change of designation operable for controlling the second said means during total taking.

7. In a machine of the class described, the combination of an algebraic totalizer, actuating means for said totalizer, card sensing means for controlling said actuating means, change-of-designation devices associated with said card sensing means, total taking devices associated with said totalizer, and a movable control shaft which may be rendered effective by said change-of-designation devices to effect shifting of said totalizer according to the sign of the total upon said totalizer and to thereafter affect said total taking devices to condition the machine for total taking.

WILLIAM W. LASKER.